US006763803B2

United States Patent
Wild et al.

(10) Patent No.: US 6,763,803 B2
(45) Date of Patent: Jul. 20, 2004

(54) METHOD, COMPUTER PROGRAM AND ARRANGEMENT FOR CONTROLLING THE PRESSURE IN AN UNDERPRESSURE STORE OF A PNEUMATICALLY OPERATED SERVO SYSTEM

(75) Inventors: Ernst Wild, Oberriexingen (DE); Kristina Eberle, Hardthof (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 09/919,862

(22) Filed: Aug. 2, 2001

(65) Prior Publication Data

US 2002/0017274 A1 Feb. 14, 2002

(30) Foreign Application Priority Data

Aug. 2, 2000 (DE) .......................................... 100 37 568

(51) Int. Cl.[7] .............................................. F02D 41/00
(52) U.S. Cl. ..................... 123/361; 303/114.3
(58) Field of Search ................................. 123/361, 399; 477/202; 303/114.3, 115.3

(56) References Cited

U.S. PATENT DOCUMENTS

| 6,095,116 A | * | 8/2000 | Matsushita et al. | .......... 123/350 |
| 6,223,717 B1 | * | 5/2001 | Wiemers | .................... 123/295 |
| 6,321,716 B1 | * | 11/2001 | Mashiki et al. | ............. 123/295 |

* cited by examiner

*Primary Examiner*—Mahmoud M Gimie
(74) *Attorney, Agent, or Firm*—Walter Ottesen

(57) ABSTRACT

The pressure in an underpressure store of a pneumatically operated servo system is controlled by a method wherein the underpressure store is charged with an underpressure via a suction line. A higher desired pressure for the underpressure store is pregiven in a rest state of the servo system wherein the system is not actuated and no actuation is expected. A lower desired pressure for the underpressure store is preset in a state wherein the servo system is actuated or an actuation is expected.

14 Claims, 2 Drawing Sheets

METHOD, COMPUTER PROGRAM AND ARRANGEMENT FOR CONTROLLING THE PRESSURE IN AN UNDERPRESSURE STORE OF A PNEUMATICALLY OPERATED SERVO SYSTEM

FIELD OF THE INVENTION

The invention relates to a method for controlling (open loop and/or closed loop) the pressure in an underpressure store of a pneumatically operated servo system wherein the underpressure store is charged with underpressure via an intake manifold of an internal combustion engine.

BACKGROUND OF THE INVENTION

A method of the above-mentioned type is used, for example, in motor vehicles known in the marketplace. The brake boosters of such motor vehicles operate pneumatically and obtain their ancillary energy from an underpressure store. The underpressure store is connected via a tap line to the intake manifold of the engine of the motor vehicle. An underpressure is present in the intake manifold of the motor vehicle during operation of the engine. For this reason, the underpressure store an be evacuated and the underpressure can be made available which is required for the operation of the brake booster.

However, it is problematic that the underpressure in the intake manifold of modern engines is relatively low at least in the emission optimized or consumption optimized operating state. This is so primarily in engines having fuel direct injection wherein the throttle flap in the intake manifold is essentially open in the optimal operating state and therefore the underpressure in the intake manifold is relatively low.

Furthermore, in engines having E-gas (electronic accelerator pedal), the ignition efficiency in specific operating states (for example, during the warm-up phase) is deteriorated for the purpose of heating the catalytic converter and the throttle flap is opened further. A deteriorated ignition efficiency increases the temperature of the exhaust gas. The also resulting reduction of the torque is compensated by an additional charge in such engines, for example, after a braking action, when the underpressure in the underpressure store becomes less because of an air quantity flowing from the brake booster into the underpressure store, a measure is initiated which reduces the pressure in the intake manifold to the extent that the underpressure store can be evacuated in an adequate manner. This measure comprises, in general, that the throttle flap is closed and the engine is therefore throttled.

Such a measure means (for example, in direct injection gasoline engines) that the engine is operated in the so-called homogeneous mode of operation and not in the so-called stratified mode of operation whereby the consumption is increased. Also, the emission performance is deteriorated especially during the warm-up phase of the engine of such a motor vehicle because the heating of the catalytic converter with the throttle lap closed takes place slower because of the better ignition efficiency and therefore the catalytic converter for a longer time does not operate at its optimal operating temperature.

Alternatively or additionally, an electrical suction pump can be provided with which the underpressure store can be evacuated. Such a suction pump has, however, a limited total operating time. For this reason, the pump should be switched on as infrequently as possible.

SUMMARY OF THE INVENTION

In view of the above, it is an object of the invention to provide a method of the kind initially referred to herein which is so improved that the consumption and also the exhaust-gas performance of a corresponding internal combustion engine are improved. It is a further object of the invention to provide a method wherein a built-in suction pump, if present, is not subjected to excessive wear.

The method of the invention is for controlling the pressure in an underpressure store of a pneumatically operated servo system of a vehicle having an internal combustion engine. The method includes the steps of: applying an underpressure $p_{SR}$ to the underpressure store via a suction line; setting a higher desired pressure ($p_1$) for the underpressure store in a first state of the servo system wherein the servo system is not actuated and wherein no activation is expected; and, setting a lower desired pressure ($p_2$) for the underpressure store in a second state wherein the servo system is actuated or an actuation thereof is expected.

The above feature according to the invention is based on the realization that an underpressure is often present in the underpressure store which is not even necessary for a reliable operation of the servo system in many operating situations of the motor vehicle. With respect to the example of a brake booster, it has been determined that it is fully sufficient that a certain underpressure is present in the underpressure store at the start of the braking operation and therefore a certain support of the braking operation is possible via the servo system. This underpressure must be present in the quiescent state of the servo system in which this system is not actuated and no actuation is expected. This underpressure can be considerably less than that underpressure which is required in order to ensure a permanent and intense actuation of the servo system.

A lower desired pressure in the underpressure store means, however, automatically that the interventions with which an underpressure is established in the intake manifold of the engine can take place less frequently and/or in a less disadvantageous manner for the consumption or emission performance. This underpressure is required for the evacuation of the underpressure store. Also, an electrical suction pump which is possibly present must be less frequently switched on.

The use of the method of the invention is especially advantageous in the operation of an underpressure store at higher elevations. Since there the ambient pressure is already relatively low, under certain circumstances, measures must be taken continuously in order to further reduce the pressure in the intake manifold of the engine and thereby make available the pressure difference which is necessary in order to be able to charge the underpressure store with underpressure via the intake manifold. In such a case, the fuel consumption of the engine would be continuously increased or the emission performance would continuously deteriorate without the use of the method of the invention. Alternatively, a possibly present electrical section pump would have to be switched on continuously under certain circumstances which would clearly reduce the service life thereof. This is prevented with the method of the invention.

In order to have an adequate underpressure available at that moment at which the servo system is intended to be activated, it is advantageous when the pressure in the underpressure store corresponds to the lower desired pressure already shortly therebefore. A simple possibility for predicting the actuation of the servo system with high probability is afforded by the position of the accelerator pedal. This is accounted for in a further embodiment wherein an actuation of the servo system is expected when the work position of the accelerator pedal drops below a specific minimum value.

Especially advantageous is also when the desired pressures are determined in dependence upon the ambient pressure. In this way, for example, for a low ambient pressure, the required pressure difference (underpressure) between the underpressure store and the outside atmosphere is reduced which likewise leads to the situation that interventions into the flow in the intake manifold with which the required underpressure should be made available for evacuating the underpressure store or driving an electric pump can take place less frequently or with less intensity.

In another embodiment of the invention, a measure for reducing the pressure is initiated when the pressure in the underpressure store exceeds a limit value and then, when the pressure in the underpressure store drops below a limit value, a corresponding measure, which reduces the pressure, is ended. One of the two limit values corresponds to the desired value and the desired value distinguishes itself from the other limit value by a hysteresis factor. In this way, a tolerance range for the desired pressure in the underpressure store is provided with which the condition is prevented that measures for dropping the underpressure are initiated already for a slight pressure increase in the underpressure store.

Furthermore, various advantageous measures, which are easy to realize, are mentioned with which the underpresaure in the underpressure store can be reduced. The following are appropriate, namely: closing of a throttle flap in the intake manifold and/or switching on a suction pump.

The invention further relates to a computer program which is suitable for carrying out the above-mentioned method when it is executed on a computer. Here, it is especially advantageous if it is stored on a memory, especially on a flash memory.

The invention relates finally to an arrangement for controlling the pressure in an underpressure store of a pneumatically operated servo system of a vehicle having an internal combustion engine. The underpressure store is connected to a suction line. According to the invention, it is provided that the arrangement is so configured that it presets a higher desired pressure $p_2$ in a rest position of the servo system wherein the system is not actuated and no actuation thereof is expected and presets a lower desired pressure $p_1$ for the underpressure store 24 in a condition in which the servo system is actuated or an actuation thereof is expected.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
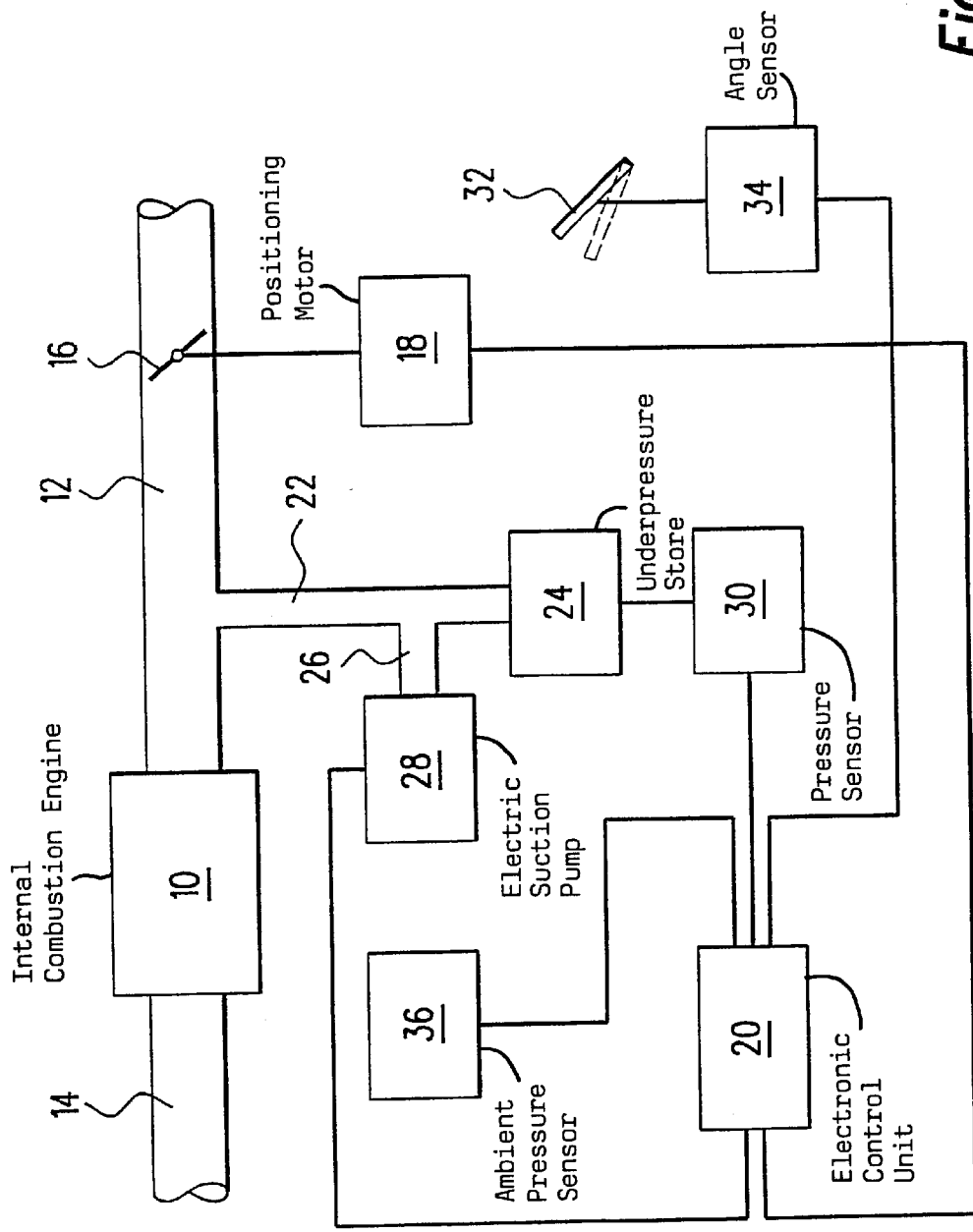
FIG. 1 is a schematic block diagram showing an arrangement according to the invention for controlling the pressure in an underpressure store of a pneumatically operated servo system on an internal combustion engine; and, FIG. 2 is a flowchart showing the method of the invention for controlling the arrangement of FIG. 1.

In FIG. 1, an internal combustion engine, such as an internal combustion engine of a motor vehicle, is identified by reference numeral 10. The engine draws air during operation via an intake manifold 12 and conducts exhaust gas away via an exhaust-gas pipe 14. A throttle flap 16 is mounted in the intake manifold 12 and can be moved by a positioning motor 18. The positioning motor 18 is, in turn, connected via a control line to electronic control unit 20.

A suction line 22 branches off the intake manifold 12 between the throttle flap 16 and the engine 10 and leads to an underpressure store 24. A correspondingly aligned check valve can be provided in the suction line 22 in order to prevent an air flow from the intake manifold 12 into the underpressure store 24. A line section 26 branches off from the suction line 22 and leads to an electrical suction pump 28. The suction pump 28 is also connected to the electronic control unit 20 via a control line. A pressure sensor 30 is mounted on the underpressure store 24 and is connected at its output end to the electronic control unit 20.

The underpressure store functions to make an underpressure available which is needed by a servo system, especially a brake booster (not shown) for a vehicle brake. When the brake is actuated, air flows from the brake booster into the underpressure store 24. The underpressure store 24 is, in turn, evacuated by the intake manifold 12 of the engine 10 and/or the electric suction pump 28.

In FIG. 1, an accelerator pedal 32 is shown schematically and is shown in a rest position (solid line) and a work position (broken line). The accelerator pedal 32 is connected to an angle sensor 34 which likewise supplies signals via an output to the electronic control unit 20. Finally, an ambient pressure sensor 36 is provided which outputs signals to the electronic control unit 20 corresponding to the ambient pressure.

Figure 2:
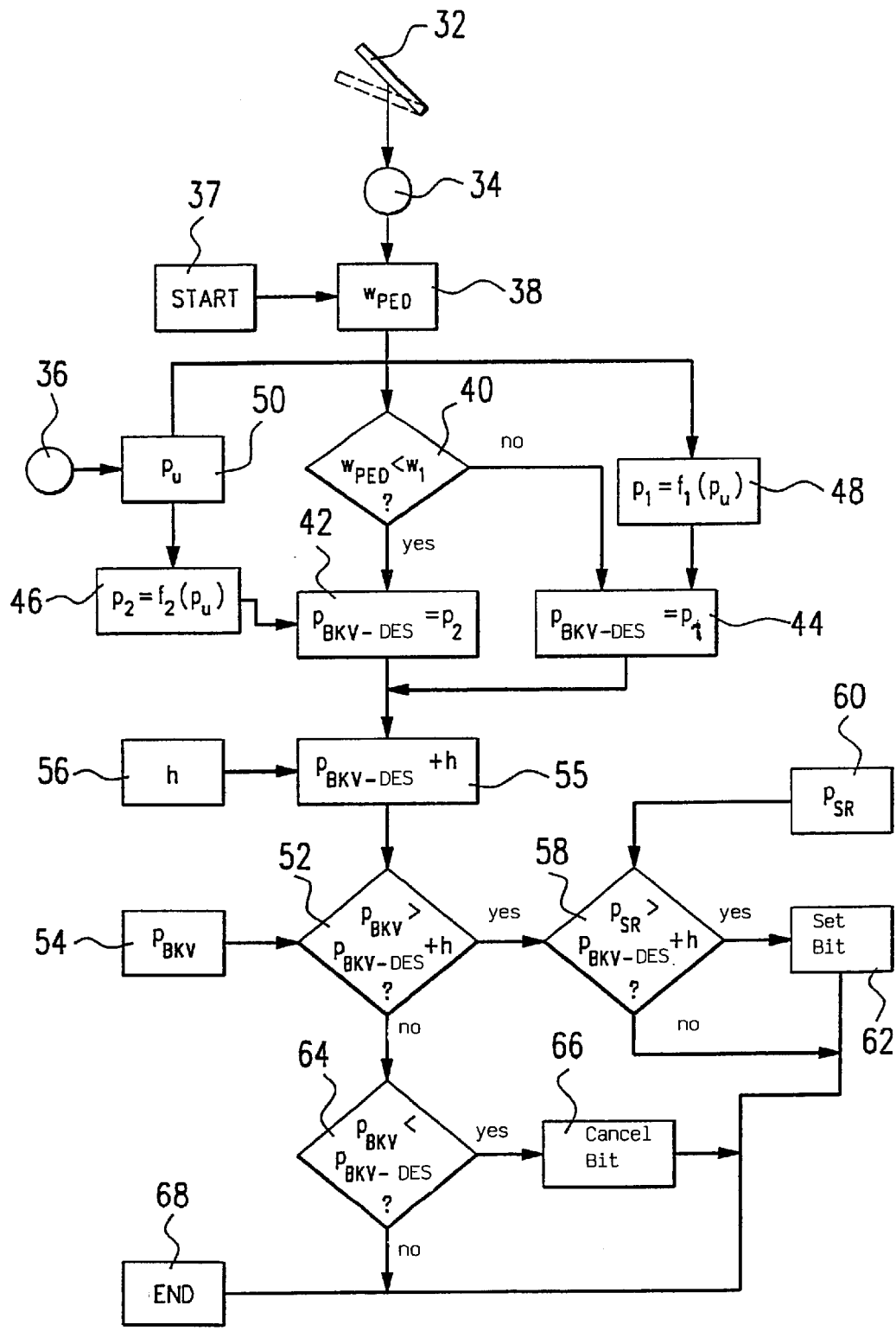

The operability and the interrelationship of the components shown in FIG. 1 will now be explained with respect to the flowchart shown in FIG. 2.

The method starts in start block 37. A signal $w_{PED}$ from angle sensor 34 is made ready in block 38 and this signal corresponds to the angular position of the accelerator pedal 32. If the accelerator pedal is in its rest position, then $w_{PED}$ has the value 0. The signal $w_{PED}$ has a value greater than 0 in the work position of the accelerator pedal 32 shown in phantom outline in FIG. 2.

The angular position $w_{PED}$ of the accelerator pedal 32 is compared to a limit value $w_1$ in the decision block 40. If the angular position $w_{PED}$ is less than $w_1$ (that is, the work position of the accelerator pedal 32 drops below a specific minimum value $w_1$), then it can be assumed that braking is to take place immediately. As explained above, a braking leads to an air flow from the brake booster into the underpressure store 24. In order to make available the underpressure in the underpressure store 24 needed for the expected braking, the desired pressure $p_{BKV\text{-}DES}$ in the underpressure store 24 is set equal to a value $p_2$ in the block 42. If the response in the decision block 40 is no, the accelerator pedal 32 is therefore pressed down relatively far and the desired pressure $p_{BKV\text{-}DES}$ is set equal to a value $p_1$ in block 44.

To determine whether a braking is present, the brake light signal can also be used or the pressure in the brake booster can be used. A conclusion can be drawn as to a braking about to happen also from the acceleration signals.

The values $p_1$ and $p_2$ are computed in the blocks 48 and 46, respectively, on the basis of the ambient pressure $p_U$ (block 50) made available by the ambient pressure sensor 36. The corresponding functions $f_1$ and $f_2$ are used for the computation of $p_1$ and $p_2$ in blocks 43 and 46, respectively. The functions $f_1$ and $f_2$ are so selected that $p_2$ is less than $p_1$ ($p_2$ corresponds to a more intense underpressure in the underpressure store 24). In this way, it is therefore achieved that, when the work position of the accelerator pedal 32 drops below a specific minimum value $w_1$, the desired pressure $p_{BKV\text{-}DES}$ is reduced from a value $p_1$ to a value $p_2$ in magnitude. On the other hand, the logic coupling to the ambient pressure $p_U$ ensures that no low desired pressures $p_{BKV-DES}$ are requested which are unrealistically low.

In the decision block 52, the actual pressure $p_{BKV}$ (block 54), which is supplied by the pressure sensor 30 and which is present in the underpressure store 24, is compared to a limit value. The limit value is, in turn, formed by a summation of the desired pressure $p_{BKV-DES}$ and a constant hysteresis factor h made available in block 56. This summation takes place in block 55 and the desired pressure $p_{BKV-DES}$ is determined in block 42 or 44.

If the result of the check in block 52 is positive, that is, the actual pressure $p_{BKV}$, which is present in the underpressure store 24, is greater than the limit value, then a check is made in block 58 as to whether the pressure $p_{SR}$ is greater than the limit value. The pressure $p_{SR}$ in the intake manifold 12 is made available in block 60. The pressure $p_{SR}$ can be either detected by a sensor mounted in the intake manifold 12 or can be computed from the through-flow quantity and the temperature in the intake manifold 12.

When the pressure $p_{SR}$ in the intake manifold 12 is actually greater than the limit value, an evacuation of the underpressure store 24 cannot be carried out without corresponding measures For this reason, a bit is set in this case in block 62 via which, for example, the positioning motor 18 of the throttle flap 16 is so driven that the air flow is throttled in the intake manifold 12 and thus the pressure $p_{SR}$ is reduced in the intake manifold 12. Additionally or alternatively, the electric suction pump 28 can be driven via which the underpressure store 24 can be directly evacuated. Thereafter, as well as in the event of a negative result in block 58, the method is ended in block 68.

When the actual pressure $p_{BKV}$ in the underpressure store 24 is less than the limit value in block 52, a check is made in block 64 as to whether the actual pressure $p_{BKV}$ in the underpressure store 24 is less than a second limit value which differs from the limit value in block 52 by the hysteresis factor h. With the hysteresis factor h it is prevented that, for pressures in the underpressure store 24 in the region of the desired pressure, sequential switching operations (fluttering) take place too quickly either of the throttle flap 16 and/or of the electrical suction pump 28 which would subject the components to intense loading. If the result of the check in block 64 is positive, then the bit is cancelled in block 66, that is, measures initiated for reducing the pressure $p_{BKV}$ in the underpressure store 24 are ended. After block 66, the method ends in block 68.

From block 68, a jump back to the start block 37 takes place and is event controlled or is at a specific time-dependent pulse rate.

It is understood that the foregoing description is that of the preferred embodiments of the invention and that various changes and modifications may be made thereto without departing from the spirit and scope of the invention as defined in the appended claims.

What is claimed is:

1. A method for controlling the pressure in an underpressure store of a pneumatically operated servo system of a vehicle having an internal combustion engine, the method comprising the steps of:

applying an underpressure $p_{SR}$ to said underpressure store via a suction line;

setting a higher desired pressure ($p_1$) for said underpressure store in a first state of said servo system wherein said servo system is not actuated and wherein no activation is expected; and, setting a lower desired pressure ($p_2$) for said underpressure store in a second state wherein said servo system is actuated or an actuation thereof is expected.

2. The method of claim 1, wherein an actuation of said servo system is expected when the work position ($w_{PED}$) of said accelerator pedal drops below a specific minimum value ($w_1$).

3. The method of claim 1, wherein said higher and lower desired pressures ($p_1$, $p_2$) are determined in dependence upon the ambient pressure ($p_U$).

4. The method of claim 1, the method comprising further the steps of:

initiating a first measure to reduce the pressure when the pressure ($p_{BKV}$) in said underpressure store exceeds a first limit value ($p_{BKV-DES}$+h);

terminating said first measure when the pressure in said underpressure store drops below a second limit value ($p_{BKV-DES}$); and, forming said first limit value ($p_{BKV-DES}$+h) from said higher desired pressure ($p_1$) and forming said second limit value ($p_{BKV-DES}$) from said lower desired pressure ($p_2$) with said limit value differing from each other by a hysteresis (h).

5. The method of claim 4, wherein said measure includes at least one of the following: closing a throttle flap in an intake manifold and switching on a suction pump fluidly connected to said underpressure store.

6. A computer program for carrying out a method for controlling the pressure in an underpressure store of a pneumatically operated servo system of a vehicle having an internal combustion engine and the computer program comprising being suitable for carrying out the following method steps when executed on a computer:

applying an underpressure $p_{SR}$ to said underpressure store via a suction line;

setting a higher desired pressure ($p_1$) for said underpressure store in a first state of said servo system wherein said servo system is not actuated and wherein no activation is expected; and, setting a lower desired pressure ($p_2$) for said underpressure store in a second state wherein said servo system is actuated or an actuation thereof is expected.

7. The computer program of claim 6, wherein said program is stored in a memory.

8. The computer program of claim 7, wherein said memory is a flash memory.

9. An arrangement for controlling the pressure in an underpressure store of a pneumatically operated servo system of a vehicle having an internal combustion engine, the arrangement comprising:

means for applying an underpressure $p_{SR}$ to said underpressure store via a suction line;

means for setting a higher desired pressure ($p_1$) for said underpressure store in a first state of said servo system wherein said servo system is not actuated and wherein no activation is expected; and, means for setting a lower desired pressure ($p_2$) for said underpressure store in a second state wherein said servo system is actuated or an actuation thereof is expected.

10. The arrangement of claim 9, further comprising:

means for detecting a completed or expected actuation of said servo system;

a device for determining the pressure ($p_{BKV}$) in said underpressure store;

a desired value transducer for setting at least two different ones of said desired values ($p_1$, $p_2$) for the underpressure in said underpressure store;

a desired value store into which one of the two desired values ($p_1$, $p_2$) can be stored; and, a decision block having an input connected to said detecting means and having an output connected to said desired value store in such a manner that said decision block, when said detecting means detects a completed or expected actuation of said servo system, loads said lower desired value ($p_2$) into said desired value store and, otherwise, loads said higher desired value ($p_1$) into said desired value store.

11. The arrangement of claim 10, further comprising a comparator for comparing said pressure ($p_{BKV}$) in said underpressure store to a limit value formed from the desired value and, when said limit value is exceeded, initiating a measure to reduce said pressure ($p_{BKV}$) in said underpressure store.

12. The arrangement of claim 11, wherein said comparator is a first comparator and said limit value is a first limit value; and, wherein said arrangement comprises a second comparator for comparing the actual pressure ($p_{BKV}$) in said underpressure store to a second limit value formed from the desired value and, when there is a drop below said second limit value, ending the initiated measure for reducing said pressure ($p_{BKV}$) in said underpressure store.

13. The arrangement of claim 12, further comprising a summing circuit for forcing one of said limit values by adding a hysteresis factor (h) to the desired value.

14. The arrangement of claim 13, wherein said suction line is connected to at least one of said intake manifold and a suction pump.

* * * * *

UNITED STATES PATENT AND TRADEMARK OFFICE
CERTIFICATE OF CORRECTION

PATENT NO. : 6,763,803 B2
DATED : July 20, 2004
INVENTOR(S) : Ernst Wild, Kristina Eberle and Lutz Reuschenbach It is certified that error appears in the above-identified patent and that said Letters Patent is hereby corrected as shown below:

Column 8,
Line 10, delete "forcing" and insert -- forming -- therefor.

Signed and Sealed this

Twenty-third Day of November, 2004

JON W. DUDAS
*Director of the United States Patent and Trademark Office*